United States Patent [19]
Togashi

[11] Patent Number: 5,145,242
[45] Date of Patent: Sep. 8, 1992

[54] ELASTIC ENDLESS CRAWLER

[75] Inventor: Sumio Togashi, Kanagawa, Japan

[73] Assignee: Bridgestone Corporation, Tokyo, Japan

[21] Appl. No.: 728,014

[22] Filed: Jul. 8, 1991

Related U.S. Application Data

[63] Continuation of Ser. No. 481,483, Feb. 16, 1990, abandoned.

[30] Foreign Application Priority Data

Feb. 23, 1989 [JP] Japan .................. 1-20735[U]

[51] Int. Cl.⁵ ............................................. B62D 55/24
[52] U.S. Cl. ........................... 305/35 EB; 305/38
[58] Field of Search ............... 305/35 R, 35 EB, 38, 305/39, 53

[56] References Cited

U.S. PATENT DOCUMENTS

| | | |
|---|---|---|
| 3,582,154 | 6/1971 | Russ, Sr. .................. 305/35 EB |
| 3,622,209 | 11/1971 | Leyden .................. 305/38 |
| 3,934,944 | 1/1976 | Forsgren .................. 305/38 |
| 4,904,030 | 2/1990 | Ono .................. 305/35 EB |

FOREIGN PATENT DOCUMENTS

| | | |
|---|---|---|
| 718800 | 9/1965 | Canada .................. 305/38 |
| 3435486 | 4/1985 | Fed. Rep. of Germany ... 305/35 EB |
| 1603135 | 4/1971 | France .................. 305/35 EB |
| 0019683 | 2/1980 | Japan .................. 305/35 EB |
| 0119572 | 9/1980 | Japan .................. 305/35 EB |
| 0030667 | 2/1982 | Japan .................. 305/35 R |
| 0095272 | 6/1982 | Japan .................. 305/35 EB |
| 0144175 | 9/1982 | Japan .................. 305/35 EB |
| 0075070 | 4/1986 | Japan .................. 305/35 EB |
| 1028859 | 5/1966 | United Kingdom .................. 305/38 |

Primary Examiner—Russell D. Stormer
Attorney, Agent, or Firm—Jordan & Hamburg

[57] ABSTRACT

An elastic endless crawler has cords arranged in a crawler body composed of elastic materials such as an endless belt-like rubber material in and along the longitudinal direction of the crawler body. Main cord layers are embedded in the crawler body to restrain elongation of the crawler body in the longitudinal direction. Bias cord layers are also embedded in the crawler body. The bias cords of the bias cord layers are so arranged that they incline reciprocally in mutually-opposite directions in relation to a straight line measured in the transverse direction of the crawler body which intersects the longitudinal direction of the crawler body at a right angle.

3 Claims, 3 Drawing Sheets

1

ELASTIC ENDLESS CRAWLER

This application is a continuation, of application Ser. No. 07/481,483, filed Feb. 16, 1990 now abandoned.

BACKGROUND OF THE INVENTION

1. Field of Invention

The present invention relates to elastic endless crawlers for earth-moving machines and the like.

2. Description of the Prior Art

Motor vehicles such as conventional earth-moving machines are so constructed, as shown in FIG. 1, that an elastic endless crawler 100 is held between a drive tumbler 1 and a take-up tumbler 2, and lower rollers 3 roll on an inner surface of the elastic endless crawler 100. In addition, lugs 4 are provided on an outer surface of the elastic endless crawler 100. Many cores 6 are embedded in the elastic endless crawler 100 at a right angle to the longitudinal direction of a crawler body 5 so that they are parallel to one another, as shown in FIG. 2, and engagement holes 7 are provided between the cores 6, so that teeth of the drive tumbler 1 engage with the engagement holes. Also, main cord layers 8 consisting of settl cords, etc. are embedded in the crawler body 5. Additionally, protrusions 6A of the cores 6 are provided to prevent the lower rollers 3 from running off the crawler.

In conventional elastic endless crawlers as shown in FIGS. 1 and 2, when the motor vehicle travels obliquely on a slope, encounters rugged terrain, circles around, or the like, the lower rollers tend to run off the crawler, because the elastic endless crawler clings to the ground while the vehicle continues moving, whereby the elastic endless crawler is pushed relative to the motor vehicle in the transverse direction. That is, when a transverse force F acts on the elastic endless crawler 100 from the transverse direction against the width of the crawler, the crawler deviates from the center line of the motor vehicle, and consequently a slip 200 occurs as shown in FIG. 3.

SUMMARY OF THE INVENTION

It is an object of the present invention to provide an elastic endless crawler wherein lower rollers of a vehicle to which the crawler is attached do not run off the crawler; elongation of the crawler body in the longitudinal direction of the crawler is restricted by means of steel cords, etc. forming main cord layers; and, at the same time, slip of the crawler in the transverse direction of the width of the crawler body is prevented.

In a preferred embodiment of the present invention, bias cord layers are embedded in the crawler body, the bias cord layers having bias cords arranged so as to incline reciprocally in mutually-opposite directions in relation to a straight line measured in the transverse direction of the crawler body which intersects the longitudinal direction of the crawler body at a right angle. The angle of inclination $\theta$ of the bias cords of the bias cord layers is set up at $5° \leq \theta \leq 45°$, preferably at $5° \leq \theta \leq 35°$.

A further object and advantages of the present invention will become clear from the following detailed description.

DETAILED DESCRIPTION OF THE PREFERRED EMBODIMENTS

Figure 1:
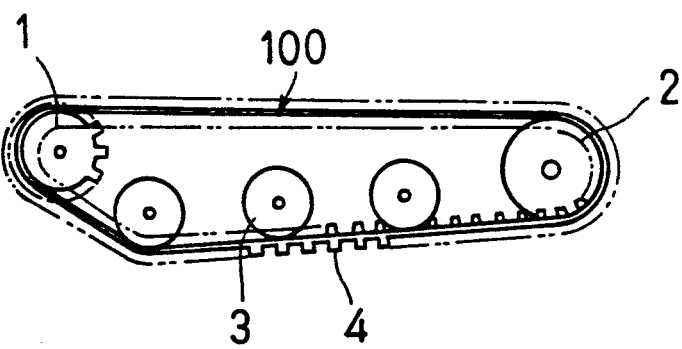
FIG. 1 is a side view of a prior art elastic endless crawler in use.
Figure 2:
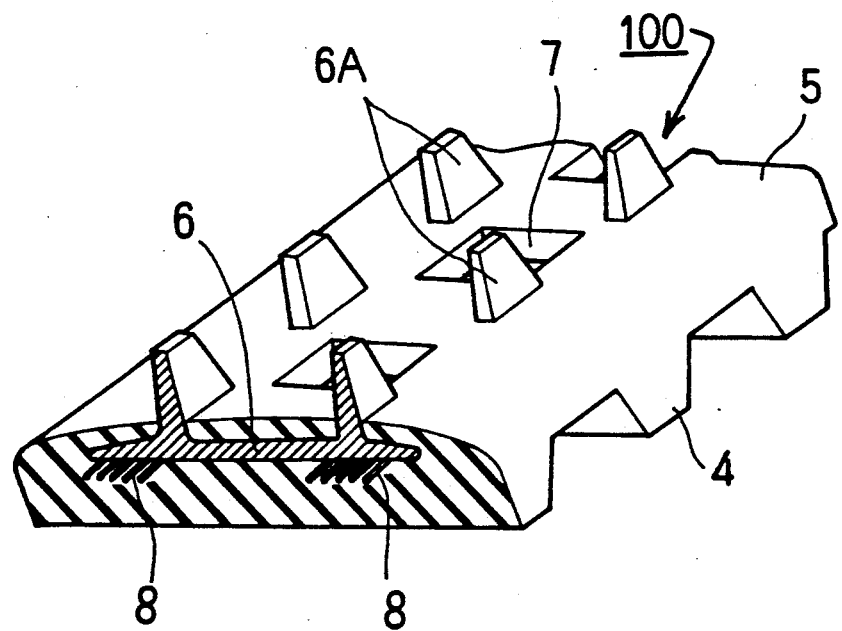
FIG. 2 is a partially cutaway perspective view of a conventional elastic endless crawler.
Figure 3:
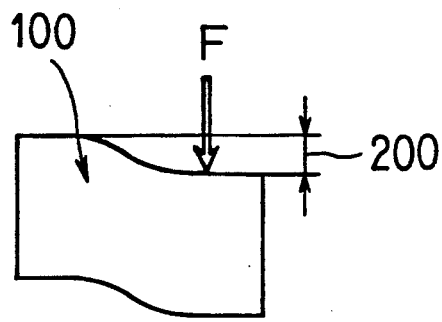
FIG. 3 is a schematic view illustrating the deficiency of conventional elastic endless crawlers.
Figure 4:
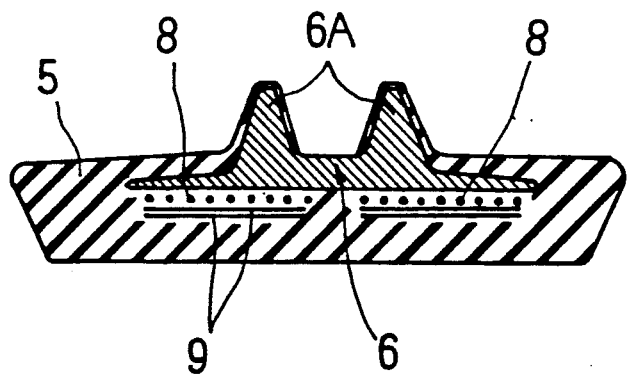
FIG. 4 is a sectional view of a crawler body illustrating a first embodiment of the present invention.
Figure 5:
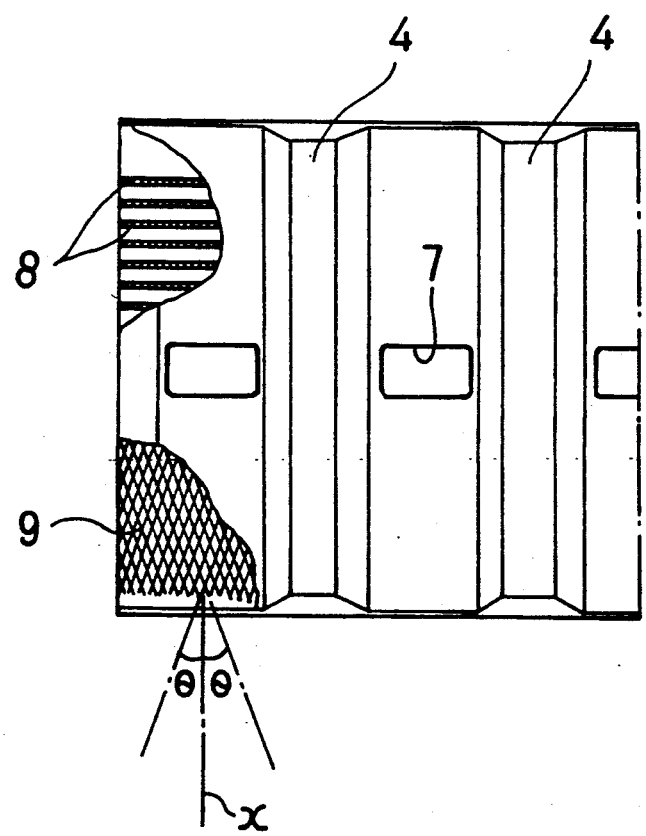
FIG. 5 is a partially cutaway plan view of the surface of the FIG. 4 crawler body which comes in contact with the ground.

In a first embodiment of the present invention shown in FIG. 4, steel cords and the like are arranged in a crawler body 5 composed of elastic materials such as endless belt-like rubber material in and along the longitudinal direction of the crawler body. Main cord layers 8 are embedded to restrict elongation of the crawler body 5 in the longitudinal direction. In addition, plural cores 6 are embedded at a right angle to the longitudinal direction of the crawler body 5 so that they are parallel to one another. Main cord layers 8 are embedded under the lower part of the cores 6 towards the side of crawler body 5 which comes in contact with the ground. Moreover, under the lower part of the main cord layers 8 towards the side of the crawler body 5 which comes in contact with the ground, two bias cord layers 9 are embedded in the crawler body having bias cords so arranged that they incline reciprocally in mutually-opposite directions in relation to a straight line measured in the transverse direction of crawler body 5 which intersects the longitudinal direction of the crawler body 5 at a right angle. FIG. 5 is a partially cutaway plan view looking at the side of the elastic endless crawler which comes in contact with the ground, and illustrates each one of the bias cord layers 9 and the main cord layers 8. As best shown in FIG. 5, the bias cord layers 9 are so arranged in crawler body 5 that they incline reciprocally in mutually-opposite directions in relation to a straight line x measured in the transverse direction of crawler body 5 which intersect the longitudinal direction of the crawler body 5 at a right angle. An angle of inclination $\theta$ of the bias cords 9 is desirably within a range of $5° \leq \theta \leq 45°$, and preferably within the range of $5° \leq \theta \leq 35°$.

As for the type of bias cords that constitute the bias cord layers 9 and the cords of main cord layers 8, the use of steel cords, Kevlar (Trade Mark), textile cords, etc. is suitable.

Figure 6:
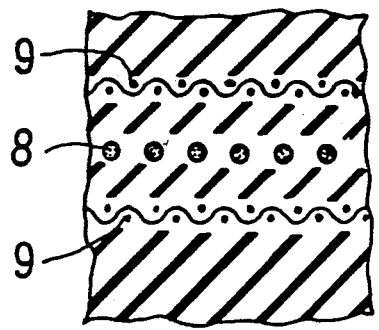
FIG. 6 is a cross-sectional view illustrating a second embodiment of the present invention.

In a second embodiment shown in FIG. 6, a construction wherein bias cord layers 9 are arranged on upper and lower sides of each main cord layer 8 is illustrated.

Figure 7:
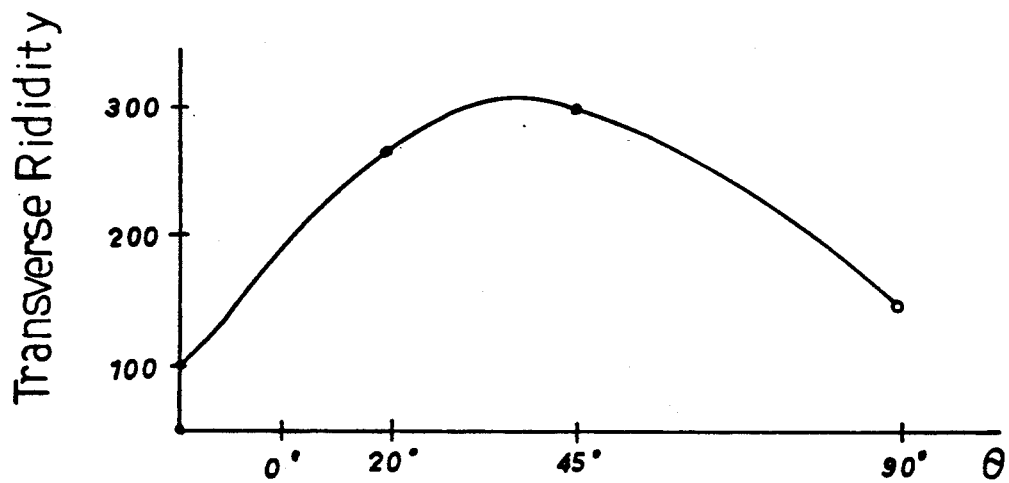
FIG. 7 is a graph illustrating the relationship between angle of inclination of bias cords and transverse rigidity.
Figure 8:
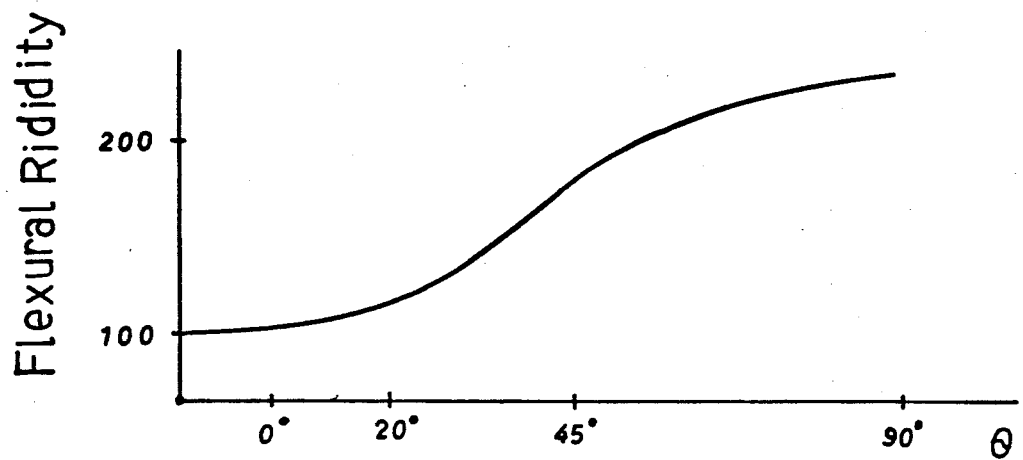
FIG. 8 is a graph illustrating the relationship between angle of inclination of bias cords and winding (flexural) rigidity.

The graph in FIG. 7 illustrates the relationship between the angle of inclination $\theta$ of the bias cords of the bias cord layers 9 and transverse rigidity. The transverse rigidity becomes maximum at the point where the angle of inclination $\theta$ slightly exceeds 35°, and does not increase further at any larger angles. FIG. 8 is a graph showing the relationship between the angle of inclination $\theta$ and flexural rigidity. It can be seen from the graph in FIG. 8 that the larger the angle of inclination $\theta$ becomes, the more the flexural rigidity increases. As defined herein, flexural rigidity is the rigidity which occurs when the elastic endless crawler moves on a drive tumbler 1 and a take-up tumbler 2. When the flexural rigidity is too strong, the mobility of the crawler on the drive tumber 1, etc., becomes difficult. Accordingly, the smaller the flexural rigidity, the more the flexural rigidity suits the mobility of the crawler. Since it is desirable that flexural rigidity be small and transverse rigidity be large, it has been ascertained that the angle of inclination $\theta$ must be, for this purpose, within the range of $5° \leq \theta \leq 45°$. Therefore, when bias cord layers 9 are embedded in the crawler body 5 at an angle of inclination within this range, even when the motor vehicle travels obliquely on a slope, encounters rugged terrain, circles around, or the like, because the elastic endless crawler has, to some extent, transverse rigidity, the construction staves off the risks that the elastic endless crawler will deviate relatively from the center line of the motor vehicle and that the lower rollers will run off the crawler because the vehicle moves alone apart from the elastic endless crawler.

Additionally, it should be noted that the bias cords inclining reciprocally in mutually-opposite directions may be either woven or non-woven bias cords.

What is claimed is:

1. An elastic endless crawler for use with motor vehicles such as earth-moving vehicles having lower rollers for rolling on the crawler comprising, a crawler body of elastic material, said crawler body having a longitudinal direction and a transverse direction and also having an inner surface and an outer surface for engaging the ground and comprising an endless belt extending in said longitudinal direction;

a pair of main cord layers embedded in said crawler body beneath said inner surface and comprising cords extending in said longitudinal direction of said crawler body to prevent elongation of said crawler body in said longitudinal direction, said layers being located at respective opposite side portions of said crawler body and being laterally spaced from a central portion of said crawler body, said central portion being free of said longitudinally extending cords;

a plurality of cores embedded in said crawler body between said inner surface and said main cord layers, said cores having protrusions for engaging said lower rollers thereby to prevent said lower rollers from running off said crawler, said cores being arranged in parallel spaced relation at a right angle to said longitudinal direction of said crawler body; and a pair of sets of bias cord layers embedded in said crawler body between said main cord layers and said outer surface, each of said sets consisting of a plurality of bias cord layers, said bias cord layers of each of said sets comprising bias cords arranged in reciprocal mutually-opposite directions in relation to an imaginary straight line extending transversely of said crawler body, said imaginary straight line intersecting the longitudinal direction of said crawler body at a right angle, said sets being located at said respective opposite side portions of said crawler body and being laterally spaced from said central portion of said crawler body, said central portion being free of said bias cord layers;

wherein said bias cords are arranged in reciprocal mutually-opposite directions in relation to said imaginary straight line at an angle of inclination $\theta$ of $5° \leq \theta \leq 45°$; and wherein said cords constituting a pair of main cord layers and said cords constituting a pair of sets of bias cord layers are made of steel.

2. An elastic endless crawler as in claim 1, wherein said bias cords are arranged in reciprocal mutually-opposite directions in relation to said imaginary straight line at an angle of inclination $\theta$ of $5° \leq \theta \leq 35°$.

3. An elastic endless crawler as in claim 1, wherein said elastic material is rubber.

* * * * *